(12) United States Patent
Okubo

(10) Patent No.: US 8,508,143 B2
(45) Date of Patent: Aug. 13, 2013

(54) LIGHT EMITTING DIODE DRIVING CIRCUIT

(75) Inventor: Takuya Okubo, Kariya (JP)

(73) Assignee: Denso Corporation, Kariya (JP)

( * ) Notice: Subject to any disclaimer, the term of this patent is extended or adjusted under 35 U.S.C. 154(b) by 197 days.

(21) Appl. No.: 12/656,535

(22) Filed: Feb. 2, 2010

(65) Prior Publication Data

US 2010/0194301 A1  Aug. 5, 2010

(30) Foreign Application Priority Data

Feb. 5, 2009  (JP) ................................ 2009-025212

(51) Int. Cl.
*H05B 37/00* (2006.01)
(52) U.S. Cl.
USPC ........ 315/224; 315/209 R; 315/226; 315/291; 315/297
(58) Field of Classification Search
USPC .................. 315/224, 226, 185 R, 209 R, 291, 315/294
See application file for complete search history.

(56) References Cited

U.S. PATENT DOCUMENTS

| | | | |
|---|---|---|---|
| 6,621,235 B2 * | 9/2003 | Chang ............................ | 315/216 |
| 7,262,582 B2 | 8/2007 | Warita et al. | |
| 2006/0256050 A1 | 11/2006 | Ikeda | |
| 2008/0143266 A1 * | 6/2008 | Langer ...................... | 315/185 R |

FOREIGN PATENT DOCUMENTS

| | | |
|---|---|---|
| JP | A-3-222632 | 10/1991 |
| JP | A-2003-100472 | 4/2003 |
| JP | A-2005-261009 | 9/2005 |
| JP | A-2006-269932 | 10/2006 |
| JP | A-2007-129862 | * 5/2007 |
| JP | A-2008-91311 | 4/2008 |
| JP | A-2008-126958 | 6/2008 |

OTHER PUBLICATIONS

Office Action mailed on Mar. 29, 2011 issued in the Corresponding Japanese Patent Application No. 2009-025212 (English translation enclosed).
Office Action mailed Oct. 4, 2011 in Corresponding JP Application No. 2009-025212 (and English translation).

* cited by examiner

*Primary Examiner* — Douglas W Owens
*Assistant Examiner* — Jonathan Cooper
(74) *Attorney, Agent, or Firm* — Posz Law Group, PLC

(57) ABSTRACT

In a driving circuit for controlling a brightness of a light emitting diode based on a duty ratio of a pulse-width modulation signal, an integration circuit is disposed on a connecting line between a gate of a first transistor coupled with a constant current source and a gate of a second transistor coupled in series with a light emitting diode. The integration circuit smoothes a change in a gate voltage of the first transistor and transmit a smoothed change in the gate voltage to the gate of the second transistor. A third transistor is coupled between a ground and a portion of the connecting line located between the gate of the first transistor and the integration circuit. The third transistor is activated and deactivated based on the duty ratio, thereby changing the gate voltages of the first transistor and the second transistor.

3 Claims, 3 Drawing Sheets

FIG. 2A PWM 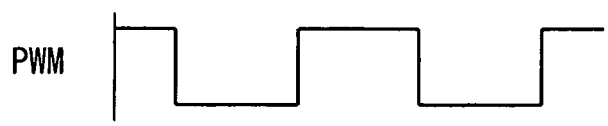
FIG. 2B Vg 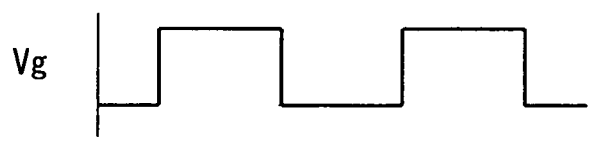
FIG. 2C ILED 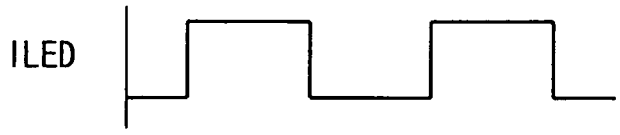
FIG. 2D IL 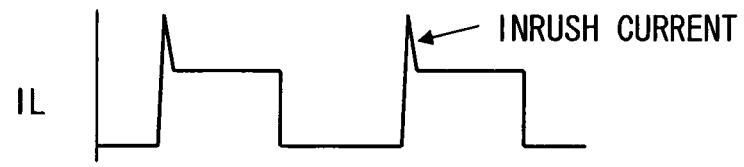
INRUSH CURRENT
FIG. 2E Vout 
FIG. 2F Vin 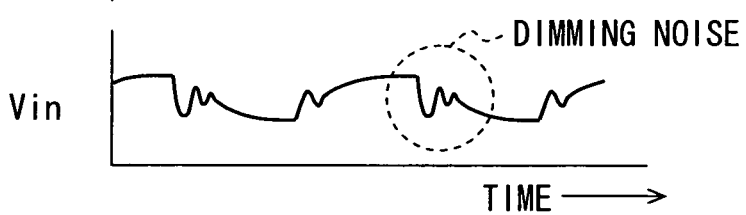
DIMMING NOISE
TIME →

FIG. 3A PWM 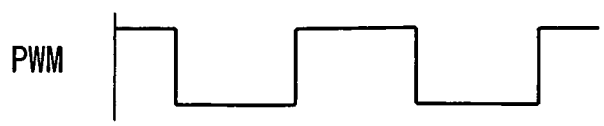
FIG. 3B Vg 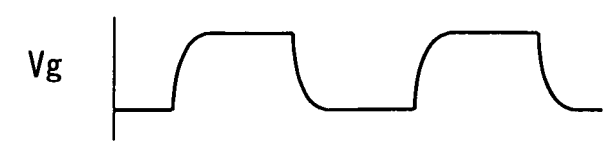
FIG. 3C ILED 
FIG. 3D IL 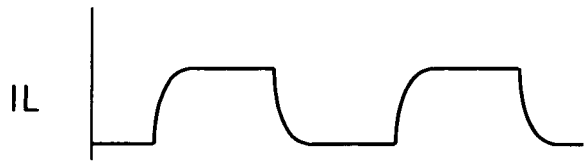
FIG. 3E Vout 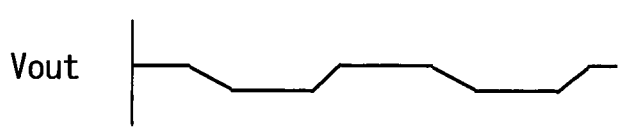
FIG. 3F Vin 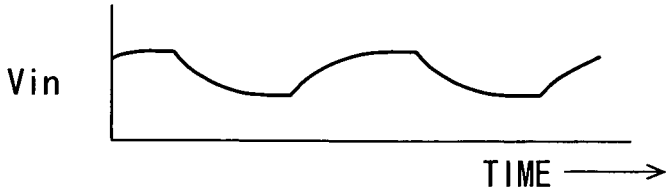
TIME →

LIGHT EMITTING DIODE DRIVING CIRCUIT

CROSS REFERENCE TO RELATED APPLICATIONS

The present application is based on and claims priority to Japanese Patent Application No. 2009-25212 filed on Feb. 5, 2009, the contents of which are incorporated in their entirety herein by reference.

BACKGROUND OF THE INVENTION

1. Field of the Invention

The present invention relates to a driving circuit for a light emitting diode.

2. Description of the Related Art

Conventionally, a thin liquid crystal display device is used for a television and a navigation apparatus. As a backlight source of the liquid crystal display device, a light emitting diode is used because the light emitting diode has various advantages compared with a cold cathode tube. For example, the light emitting diode has a better environment property, the light emitting diode can be driven at a lower voltage, and the light emitting diode has a better low-temperature property.

The liquid crystal display device is generally configured so that a brightness of the backlight source, that is, a brightness of the liquid crystal display device can be changed based on a change in a surrounding brightness between day and night or a user setting. For example, JP-A-2005-261009 discloses a circuit in which a boost voltage of a boost circuit is applied to a light emitting diode, electricity is supplied to the light emitting diode, and when a boost operation is stopped and an applied voltage is reduced, the supply of electricity to the light emitting diode is stopped. The boost operation of the boost circuit is activated and deactivated based on a duty ratio of a brightness control signal, and thereby the brightness of the light emitting diode is controlled.

When a state is changed from a state where electricity is not supplied to the light emitting diode to a state where electricity is supplied to the light emitting diode, a large current (hereafter, called inrush current) instantaneously flows to the light emitting diode. Due to the inrush current, an input voltage applied to the light emitting diode is changed, and thereby a noise (hereafter, called a dimming noise) generates in the power source line. The dimming noise may affect an operation of other device coupled with the power source line and may cause an electromagnetic noise.

The above-described circuit includes a soft start circuit for restricting a generation of the inrush current. When an operation of a switching element for activating and deactivating the boost operation of the boost circuit is started, the soft start circuit gradually changes an output duty of a drive circuit which operates the switching element. Accordingly, a boost voltage output from the boost circuit is gradually increased and an inrush current can be restricted.

The above-described drive circuit outputs the output duty based on a magnitude relation between a voltage level and a triangular wave. The voltage level changes based on a comparison result of a feedback voltage, which corresponds to electric current flowing to the light emitting diode, and a reference voltage. The soft start circuit gradually increases the voltage level changed based on the comparison result of the feedback voltage and the reference voltage to a High level. Accordingly, the output duty depending on the magnitude relation between the voltage level and the triangular wave gradually changes.

When the output duty is gradually changed by the soft start circuit, a circuit configuration and a circuit design may be complicated, and a production cost may be increased.

SUMMARY OF THE INVENTION

In view of the foregoing problems, it is an object of the present invention to provide a light emitting diode driving circuit that can restrict a generation of an inrush current.

According to an aspect of the present invention, a driving circuit includes a first transistor, a second transistor, a connecting line, an integration circuit, and a third transistor. The first transistor is coupled with a constant current source. The first transistor is configured to receive a constant current from the constant current source when the first transistor is activated. The second transistor is coupled in series with a light emitting diode. The second transistor configurates a current mirror circuit with the first transistor. The second transistor is configured to supply the constant current to the light emitting diode when the second transistor is activated. The connecting line connects a gate of the first transistor and a gate of the second transistor. The integration circuit is disposed on the connecting line. The integration circuit configured to smooth a change in a gate voltage of the first transistor and transmit a smoothed change in the gate voltage to the gate of the second transistor. The third transistor is coupled between a ground and a portion of the connecting line located between the gate of the first transistor and the integration circuit. The third transistor is configured to be activated and deactivated based on a duty ratio of a pulse-width modulation signal, thereby changing the gate voltages of the first transistor and the second transistor between an on-voltage and an off-voltage so as to activate and deactivate the first transistor and the second transistor.

The above-described driving circuit can restrict a generation of an inrush current.

BRIEF DESCRIPTION OF THE DRAWINGS

Additional objects and advantages of the present invention will be more readily apparent from the following detailed description of exemplary embodiments when taken together with the accompanying drawings. In the drawings:

FIG. 2A to FIG. 2F are waveform diagrams illustrating waveforms of various signals in a light emitting diode driving circuit without an integration circuit; and FIG. 3A to FIG. 3F are waveform diagrams illustrating waveforms of various signals in a light emitting diode driving circuit including an integration circuit.

DETAILED DESCRIPTION OF THE EXEMPLARY EMBODIMENTS

Figure 1:
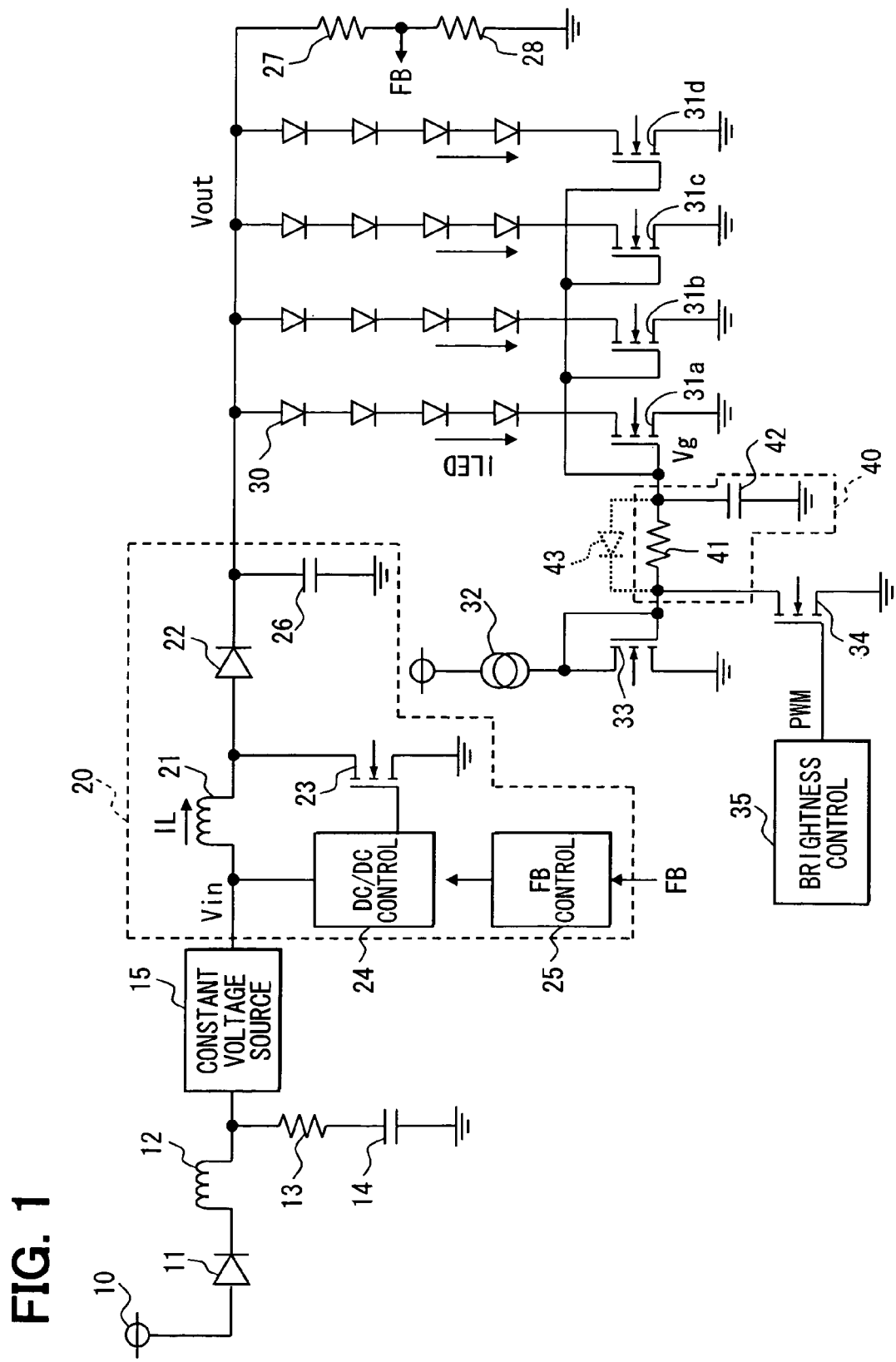
FIG. 1 is a circuit diagram of a light emitting diode driving circuit according to an exemplary embodiment of the present invention.

A light emitting diode driving circuit according to an exemplary embodiment of the present invention will be described with reference to FIG. 1. In the present embodiment, an example in which the light emitting diode driving circuit is used for driving a light emitting diode used as a backlight source of a liquid crystal display provided in a vehicle will be described. However, the light emitting diode driving circuit according to the present embodiment can also be used for driving a light emitting diode used for other purposes.

The light emitting diode driving circuit includes an in-vehicle power source 10. The in-vehicle power source 10 includes, for example, a battery provided in the vehicle and a power generator such as an alternator. The in-vehicle power source 10 supplies a source voltage to a power source line. On the power source line, a diode 11 and a reactor 12 are disposed in series. The power source line is grounded through a capacitor 14. The reactor 12 and the capacitor 14 can reduce a power generation noise by the alternator and can provide a smoothed source voltage. A resistor 13 indicates an equivalent serial resistor of the capacitor 14.

The power source line is coupled with a constant voltage source 15. The constant voltage source 15 is supplied with the source voltage of, for example, 12 V from the in-vehicle power source 10 and outputs a predetermined constant voltage of, for example, 5 V. The constant voltage output from the constant voltage source 15 is input to a boost circuit 20. In the present embodiment, the boost circuit 20 is configured to only boost. Thus, the constant voltage source 15 is provided. When the boost circuit 20 is configured to boost and reduce voltage, the constant voltage source 15 can be omitted.

The boost circuit 20 boosts an input voltage Vin from the constant voltage source 15 and outputs an output voltage Vout for driving a plurality of light emitting diodes 30. The boost circuit 20 includes a DC-DC converter. That is, the boost circuit 20 includes a choke coil 21, a diode 22, a capacitor 26, an N channel MOS transistor 23 as a switching element, a DC/DC control portion 24 and a feedback (FB) control portion 25.

The choke coil 21 and the diode 22 are coupled in series to the power source line. The MOS transistor 23 is disposed between the ground and a connecting line that connects the choke coil 21 and the diode 22. The capacitor 26 is disposed between the power source line on a cathode side of the diode 22 and the ground.

A pair of resistors 27 and 28 divides the output voltage Vout of the boost circuit 20 and inputs a divided voltage according to the output voltage Vout to the FB control portion 25 as an FB signal. The FB control portion 25 outputs an FB control signal to the DC/DC control portion 24 based on a difference between the divided voltage input as the FB signal and a predetermined target voltage. The DC/DC control portion 24 generates a control signal (PWM signal) based on the FB control signal output from the FB control portion. The control signal is generated for periodically activate and deactivate the MOS transistor 23 so that the output voltage Vout of the boost circuit 20 approaches a target voltage. The target voltage is 16 V, for example. Thus, the MOS transistor 23 is activated and deactivated based on the control signal from the DC/DC control portion 24, and thereby the boost circuit 20 can generate the output voltage Vout close to the target voltage.

An exemplary boost operation of the boost circuit 20 will be described. When the MOS transistor 23 is activated based on the control signal from the DC/DC control portion 24, electricity flows through the choke coil 21 and the MOS transistor 23. When the MOS transistor 23 is deactivated based on the control signal, magnetic energy stored in the choke coil 21 due to electricity that have flowed until the MOS transistor is deactivated is released as an electric energy and electric current IL generates. The electric current IL charges the capacitor 26 through the diode 22. Thus, the capacitor 26 is charged to a voltage higher than the constant voltage generated by the constant voltage source 15.

The output voltage Vout of the boost circuit 20 is applied to the light emitting diodes 30 for driving the light emitting diodes 30. More than one light emitting diodes 30 is used for providing sufficient luminescent brightness as the backlight source. In the example illustrated in FIG. 1, four lines are coupled in parallel, and each of the four lines includes four light emitting diodes 30 coupled in series.

The four lines respectively include the N channel MOS transistors 31a-31d. The MOS transistors 31a-31d can operate as a second transistor for allowing and stopping a supply of a constant current to corresponding light emitting diodes 30. Each of the MOS transistors 31a-31d has a structure similar to one another. A gate terminal of each of the MOS transistors 31a-31d is coupled with a gate terminal of an N channel MOS transistor 33 as a first transistor through an integration circuit 40. The MOS transistor 33 as the first transistor and the MOS transistors 31a-31d as the second transistor configurate a current mirror circuit.

A drain terminal of the MOS transistor 33 is coupled with a constant current source 32, and the drain terminal and the gate terminal are coupled. Thus, a positive voltage (on-voltage) is applied to a gate of the MOS transistor 33. When the MOS transistor 33 is activated, the constant current flows from the constant current source 32 to the MOS transistor 33. Thus, the constant current also flows to the MOS transistors 31a-31d, which configurates the current mirror circuit with the MOS transistor 33, and the constant current becomes an energizing current ILED of the light emitting diodes 30. The light emitting diodes 30 disposed in each of the lines are supplied with the same energizing current ILED and emit light at the same brightness. When a voltage applied to the gate of the MOS transistor 33 becomes zero (off-voltage), the MOS transistor 33 and the MOS transistors 31a-31d are deactivated, and the supply of the constant current and the energizing current ILED are stopped. The MOS transistor 33 has a size different from those of the MOS transistors 31a-31d. The MOS transistors 31a-31d are configured so that the MOS transistors 31a-31d can allow a flow of electricity hundreds times greater than that of the MOS transistor 33.

The integration circuit 40 includes a resistor 41 and a capacitor 42. The resistor 41 is disposed on the connecting line that connects the gate terminal of the MOS transistor 33 and the gate terminals of the MOS transistors 31a-31d. The capacitor 42 is disposed between the ground and a portion of the connecting line located between the resistor 41 and the MOS transistors 31a-31d. When the gate voltage of the MOS transistor 33 is changed from the on-voltage to the off-voltage or when, the gate voltage of the MOS transistor 33 is changed from the off-voltage to the on-voltage, the integration circuit 40 smoothes changes in the gate voltage. That is, the integration circuit 40 rounds rising edges and falling edges of the gate voltage of the MOS transistor 33. Then, the integration circuit 40 transmits the smoothed change in the gate voltage to the MOS transistors 31a-31d. Thus, a time lag generates between when the constant current starts to flow to the MOS transistor 33 and when the electric current flowing in the MOS transistors 31a-31d becomes the constant current.

Between the ground and a portion of the connecting line located between the MOS transistor 33 and the integration circuit 40, an N channel MOS transistor 34 as a third transistor is disposed. When the MOS transistor 34 is activated, the gate of the MOS transistor 33 is coupled to the ground. Thus, the gate voltage of the MOS transistor 33 becomes the off-voltage. When the MOS transistor 34 is deactivated, the gate voltage of the MOS transistor 33 becomes the on-voltage due to the electric current flowing from the constant current source 32 to the gate terminal. In the above-described way, the MOS transistor 34 changes the gate voltage of the MOS transistor 33 between the on-voltage and the off-voltage.

The PWM signal output from the brightness control portion 35 is input to the gate terminal of the MOS transistor 34.

The MOS transistor 34 is activated or deactivate based on the duty ratio of the PWM signal. The brightness control portion 35 determines the duty ratio of the PWM signal based on, for example, a signal that is sent when a vehicular light is activated, a signal from a detecting portion for detecting a surrounding brightness, and a brightness control order by a user. The MOS transistor 33 and the MOS transistors 31a-31d are activated and deactivated by the MOS transistor 34 which is activated and deactivated based on the duty ratio of the PWM signal. Thus, a ratio between a period when the constant current is supplied to the light emitting diodes 30 and a period when the constant current is not supplied to the light emitting diodes 30 is controlled based on the duty ratio of the PWM signal, and thereby the brightness of the light emitting diodes 30 is controlled.

As described above, the light emitting diode driving circuit according to the present embodiment includes the integration circuit 40 on the connecting line which connects the gate terminal of the MOS transistor 33 and the gate terminals of the MOS transistors 31a-31d.

FIG. 2A to FIG. 2F are waveform diagrams illustrating waveforms of various signals in a light emitting diode driving circuit that does not include the integration circuit 40. FIG. 3A to FIG. 3F are waveform diagrams illustrating waveforms of various signals in a light emitting diode driving circuit that includes the integration circuit 40. An exemplary operation of the integration circuit 40 and exemplary effects of the integration circuit 40 will be described with reference to FIG. 2A to FIG. 2F and FIG. 3A to FIG. 3F.

When the PWM signal is transmitted from the brightness control portion 35 to the MOS transistor 34 as illustrated in FIG. 2, the MOS transistor 34 is activated and deactivated based on the PWM signal. Accordingly, the gate voltage of the MOS transistor 33 is periodically changed between the on-voltage and the off-voltage. In an example illustrated in FIG. 2A to FIG. 2B, the integration circuit 40 is not coupled between the gate terminal of the MOS transistor 33 and the gate terminals of the MOS transistors 31a-31d. Thus, a gate voltage Vg of the MOS transistors 31a-31d is changed concurrently with the change of the gate voltage of the MOS transistor 33 based on the PWM signal, as illustrated in FIG. 2B. That is, the gate voltage Vg of the MOS transistors 31a-31d is instantaneously changed between the off-voltage and the on-voltage.

Therefore, when the gate voltage of the MOS transistor 33 is changed from the on-voltage to the off-voltage, the MOS transistors 31a-31d are instantaneously and simultaneously activated. Thus, the constant energizing current ILED is supplied to the light emitting diodes 30 in each of the lines just after the MOS transistors 31a-31d are activated.

The energizing current ILED is a relatively large current. Because the energizing current ILED is supplied to the light emitting diodes 30 in each of the lines, a large mount of charges is instantaneously drawn from the capacitor 26 of the boost circuit 20. Thus, the capacitor 26 is required to be charged rapidly and a large current (inrush current) instantaneously generates when the choke coil 21 of the boost circuit 20 starts to discharge the current IL.

When the inrush current generates, the output voltage Vout of the boost circuit 20 fluctuates as illustrated in FIG. 2E, and the input voltage Vin also fluctuates by being affected by the fluctuation of the output voltage Vout. The voltage fluctuation in the power source line causes a dimming noise.

In contrast, in a case where the light emitting diode driving circuit includes the integration circuit 40, for example, as illustrated in FIG. 1, when the gate voltage of the MOS transistor 33 changes between the on-voltage and the off-voltage, the integration circuit 40 smoothes the changes in the gate voltage, and thereby the gate voltage Vg of the MOS transistors 31a-31d gradually changes. That is, the gate voltage Vg of the MOS transistors 31a-31d does not instantaneously change from the off-voltage to the on-voltage but gradually changes from the off-voltage to the on-voltage as illustrated in FIG. 3B.

Thus, the light emitting diode driving circuit according to the present embodiment can gradually change the gate voltage Vg from the off-voltage to the on-voltage only by inserting the integration circuit 40 between the gate terminal of the MOS transistor 33 and the gate terminals of the MOS transistors 31a-31d.

Accordingly, the energizing current ILED supplied from the MOS transistors 31a-31d to the light emitting diodes 30 does not instantaneously become the constant current but gradually increases to the constant current. The amount of charges drawn from the capacitor 26 when the energizing current ILED starts to flow in the light emitting diodes 30 is reduced compared with a case where the light emitting diode driving circuit does not include the integration circuit 40. Thus, when the choke coil 21 starts to discharge the electric current IL, the choke coil 21 is not required to flow a large current instantaneously, and thereby a generation of an inrush current can be restricted. As a result, short-period fluctuations of the output voltage Vout and the input voltage Vin can be restricted as illustrated in FIG. 3E and FIG. 3F, and a generation of a dimming noise can be restricted.

In the light emitting diode driving circuit without the integration circuit 40, also when the gate voltage of the MOS transistors 31a-31d instantaneously changes from the on-voltage to the off-voltage and the supply of the energizing current ILED stops, the output voltage Vout and the input voltage Vin of the boost circuit 20 fluctuate as illustrated in FIG. 2E and FIG. 2F.

In contrast, in the light emitting diode driving circuit according to the present embodiment, when the gate voltage of the MOS transistor 33 instantaneously changes from the on-voltage to the off-voltage, the integration circuit 40 smoothes the change in the voltage signal, and transmits the smoothed change in the gate voltage to the gate of the MOS transistors 31a-31d. Thus, the gate voltage Vg of the MOS transistors 31a-31d gradually decreases from the on-voltage to the off-voltage as illustrated in FIG. 3B. Therefore, even when the supply of the energizing current ILED to the light emitting diodes 30 is stopped, fluctuations of the output voltage Vout and the input voltage Vin can be restricted.

The fluctuation of the voltage that generates in the power source line when the supply of the energizing current ILED to the light emitting diodes 30 is stopped is smaller than the fluctuation of the voltage when the supply of the energizing current ILED to the light emitting diodes 30 is started, as illustrated in FIG. 2D because the inrush current does not generate. Thus, even if the MOS transistors 31a-31d are instantaneously deactivated when the supply of the energizing current ILED to the light emitting diodes 30 is stopped, an influence to a generation of the dimming noise is small.

Therefore, as shown by a dotted line in FIG. 1, a rectifier diode 43 may be coupled in parallel with the integration circuit. The rectifier diode 43 has a forward direction in a direction from the gates of the MOS transistors 31a-31d toward the gate of the MOS transistor 33.

In a case where the rectifier diode 43 is disposed, when the gate voltage of the MOS transistor 33 decreases from the on-voltage to the off-voltage, the gate voltage of the MOS transistors 31a-31d can change following the gate voltage of the MOS transistor 33. That is, the gate voltage of the MOS transistors 31a-31d can instantaneously change from the on-voltage to the off-voltage concurrently with the gate voltage of the MOS transistor 33. Therefore, even when intervals of the PWM signals are short, the MOS transistors 31a-31d can be deactivated with certainty, and the brightness can be obtained with certainty based on the duty ratio of the PWM signal.

Although the present invention has been fully described in connection with the exemplary embodiments thereof with reference to the accompanying drawings, it is to be noted that various changes and modifications will become apparent to those skilled in the art.

In the above-described embodiments, the N channel MOS transistors 31a-31d, 33, 34 are respectively used as the first, the second, and the third transistors, as an example. The first to third transistors may also be P channel MOS transistors or bipolar transistors, for example.

In the above-described embodiments, the boost circuit 20 turns on and off the electric current IL from the choke coil 21 concurrently with the supply of the energizing current ILED to the light emitting diodes 30, as an example. The boost circuit 20 may also turn on and off the electric current IL with a period shorter than a period of supplying and stopping of the electric current ILED to the light emitting diodes 30.

What is claimed is:

1. A driving circuit for controlling a brightness of a light emitting diode based on a duty ratio of a pulse-width modulation signal, the driving circuit comprising:
    a first transistor coupled with a constant current source, the first transistor configured to receive a constant current from the constant current source when the first transistor is activated;
    a second transistor coupled in series with the light emitting diode, the second transistor and the first transistor included in a current mirror circuit, the second transistor configured to supply the constant current to the light emitting diode when the second transistor is activated;
    a connecting line connecting a gate of the first transistor and a gate of the second transistor;
    an integration circuit disposed on the connecting line, the integration circuit configured to smooth a change in a gate voltage of the first transistor and transmit a smoothed change in the gate voltage to the gate of the second transistor;
    a third transistor coupled between a ground and a portion of the connecting line located between the gate of the first transistor and the integration circuit, the third transistor configured to be activated and deactivated based on the duty ratio of the pulse-width modulation signal, thereby changing the gate voltages of the first transistor and the second transistor between an on-voltage and an off-voltage so as to activate and deactivate the first transistor and the second transistor; and
    a rectifier diode coupled in parallel with the integration circuit so that the gate voltage of the second transistor follows the gate voltage of the first transistor when the gate voltage of the first transistor is changed from the on-voltage to the off-voltage, the rectifier diode having a forward direction in a direction from the gate of the second transistor to the gate of the first transistor,
    wherein the anode of the rectifier diode is connected to the gate of the second transistor, and the cathode of the rectifier diode is connected to the gate of the first transistor.

2. The light emitting diode driving circuit according to claim 1, wherein
    the integration circuit is configured to round a rising edge of the gate voltage of the first transistor when the integration circuit smoothes the change in the gate voltage of the first transistor.

3. A driving circuit for controlling brightness of a light emitting diode based on a duty ratio of a pulse-width modulation signal, the driving circuit comprising:
    a current mirror including a first transistor configured to receive a constant current when activated and a second transistor coupled in series with the light emitting diode and configured to supply the constant current from the first transistor to the light emitting diode when activated, a gate of the first transistor being connected to a gate of the second transistor;
    an integration circuit configured to round rising and falling edges of a gate voltage of the first transistor and to transmit a resulting smoothed gate voltage to the gate of the second transistor;
    a third transistor coupled between ground and between the gate of the first transistor and the integration circuit, and configured to be activated and deactivated based on the duty ratio of the pulse-width modulation signal, thereby changing the gate voltages of the first transistor and the second transistor between an on-voltage and an off-voltage so as to activate and deactivate the first transistor and the second transistor; and
    a rectifier diode coupled in parallel with the integration circuit so that the gate voltage of the second transistor follows the gate voltage of the first transistor when the gate voltage of the first transistor is changed from the on-voltage to the off-voltage, the rectifier diode being oriented in a forward direction from the gate of the second transistor to the gate of the first transistor,
    wherein the anode of the rectifier diode is connected to the gate of the second transistor, and the cathode of the rectifier diode is connected to the gate of the first transistor.

* * * * *